(12) United States Patent
Bechtel et al.

(10) Patent No.: US 7,567,291 B2
(45) Date of Patent: Jul. 28, 2009

(54) VEHICLE VISION SYSTEM

(75) Inventors: Jon H. Bechtel, Holland, MI (US);
Joseph S. Stam, Holland, MI (US); Eric R. Fossum, La Crescenta, CA (US);
Sabrina E. Kemeny, La Crescenta, CA (US)

(73) Assignee: Gentex Corporation, Zeeland, MI (US)

( * ) Notice: Subject to any disclaimer, the term of this patent is extended or adjusted under 35 U.S.C. 154(b) by 1166 days.

(21) Appl. No.: 10/259,253

(22) Filed: Sep. 27, 2002

(65) Prior Publication Data

US 2003/0103141 A1    Jun. 5, 2003

Related U.S. Application Data

(63) Continuation of application No. 09/001,855, filed on Dec. 31, 1997, now abandoned.

(51) Int. Cl.
*H04N 5/222* (2006.01)
*H04N 5/225* (2006.01)

(52) U.S. Cl. .................................. 348/370; 348/342

(58) Field of Classification Search .............. 348/216.1, 348/217.1, 230.1, 333.01, 342, 370, 118, 348/149, 602
See application file for complete search history.

(56) References Cited

U.S. PATENT DOCUMENTS

| | | | |
|---|---|---|---|
| 3,875,456 A | 4/1975 | Kano et al. | |
| 4,211,955 A | 7/1980 | Ray | |
| 4,214,266 A | 7/1980 | Myers | |
| 4,256,372 A | 3/1981 | Yasukuni et al. | |
| 4,277,804 A | 7/1981 | Robison | |
| 4,298,869 A | 11/1981 | Okuno | |
| 4,377,768 A | 3/1983 | Gallaro et al. | |

(Continued)

FOREIGN PATENT DOCUMENTS

DE    4015927    11/1990

(Continued)

OTHER PUBLICATIONS

Yadid-Pecht, Orly et al., "Image Sensors With Individual Pixel Reset," *NASA Tech Briefs*, Nov. 1996 (2 pages).

(Continued)

*Primary Examiner*—James M Hannett
*Assistant Examiner*—Kelly L Jerabek
(74) *Attorney, Agent, or Firm*—Price, Heneveld, Cooper, DeWitt & Litton, LLP

(57) ABSTRACT

A vehicle viewing system including a camera system for generating a signal corresponding to a scene by integrating light from the scene incident on pixel cells having a variable integration time, a display system for presenting a visual representation of the scene, and a processor system operable to determine the camera system integration time based on brightness levels in the scene. The camera system preferably includes and an input attenuating filter to limit light striking the optical array. The processor system includes an image brightness detector to determine overall image brightness and a display control to determine luminance settings for the display system. The processor system may determine the intensity of the display system based on the brightness of the scene, ambient light levels, and glare on the display. The display system includes a display and a display attenuation filter for limiting the intensity as viewed by the operator.

15 Claims, 6 Drawing Sheets

U.S. PATENT DOCUMENTS

| | | | |
|---|---|---|---|
| 4,450,512 A | 5/1984 | Kristofek | |
| 4,554,587 A | 11/1985 | Ooi et al. | |
| 4,580,196 A | 4/1986 | Task | |
| 4,631,516 A | 12/1986 | Clinker | |
| 4,646,210 A | 2/1987 | Skogler et al. | |
| 4,647,975 A | 3/1987 | Alston et al. | |
| 4,667,177 A | 5/1987 | Athalye | |
| 4,682,228 A * | 7/1987 | Ando et al. | 348/602 |
| 4,733,336 A | 3/1988 | Skogler et al. | |
| 4,734,697 A | 3/1988 | Robinson et al. | |
| 4,807,096 A | 2/1989 | Skogler et al. | |
| 4,849,803 A | 7/1989 | Yamamoto et al. | |
| 4,863,130 A | 9/1989 | Marks, Jr. | |
| 4,868,542 A | 9/1989 | Thompson | |
| 4,882,565 A | 11/1989 | Gallmeyer | |
| 4,891,624 A | 1/1990 | Ishikawa et al. | |
| 4,893,112 A | 1/1990 | Hatcher | |
| 4,896,136 A | 1/1990 | Hotovy | |
| 4,902,108 A | 2/1990 | Byker | |
| 4,910,591 A | 3/1990 | Petrossian et al. | |
| 4,917,477 A | 4/1990 | Bechtel et al. | |
| 4,928,084 A | 5/1990 | Reiser | |
| 4,929,866 A | 5/1990 | Murata et al. | |
| 4,947,291 A | 8/1990 | McDermott | |
| 4,985,816 A | 1/1991 | Seko et al. | |
| 4,992,704 A | 2/1991 | Stinson | |
| 5,001,609 A | 3/1991 | Gardner et al. | |
| 5,008,595 A | 4/1991 | Kazar | |
| 5,027,200 A | 6/1991 | Petrossian et al. | |
| 5,038,258 A | 8/1991 | Koch et al. | |
| 5,060,075 A | 10/1991 | Skinner | |
| 5,083,192 A | 1/1992 | Rzeznik et al. | |
| 5,121,200 A | 6/1992 | Choi | |
| 5,126,926 A | 6/1992 | Chiang Wen | |
| 5,136,483 A | 8/1992 | Schöniger et al. | |
| 5,143,433 A | 9/1992 | Farrell | |
| 5,194,957 A | 3/1993 | Kyuma | |
| 5,241,457 A | 8/1993 | Sasjima et al. | |
| 5,255,171 A | 10/1993 | Clark | |
| 5,260,731 A | 11/1993 | Baker, Jr. | |
| 5,289,082 A | 2/1994 | Komoto | |
| 5,289,321 A | 2/1994 | Secor | |
| 5,294,986 A | 3/1994 | Tsuji et al. | |
| 5,303,037 A | 4/1994 | Taranowski | |
| 5,307,136 A | 4/1994 | Saneyoshi | |
| 5,325,271 A | 6/1994 | Hutchisson | |
| 5,371,659 A | 12/1994 | Pastrick et al. | |
| 5,384,519 A | 1/1995 | Gotoh | |
| 5,387,958 A | 2/1995 | Pashley | |
| 5,414,461 A | 5/1995 | Kishi et al. | |
| 5,471,515 A | 11/1995 | Fossum et al. | |
| 5,477,436 A | 12/1995 | Bertling et al. | |
| 5,490,049 A | 2/1996 | Montalan et al. | |
| 5,495,243 A | 2/1996 | McKenna | |
| 5,497,305 A | 3/1996 | Pastrick | |
| 5,497,306 A | 3/1996 | Pastrick | |
| 5,534,920 A | 7/1996 | Kim | |
| 5,550,677 A | 8/1996 | Schofield et al. | |
| 5,555,069 A | 9/1996 | Albrecht et al. | |
| 5,564,819 A | 10/1996 | Yamaguchi | |
| 5,613,751 A | 3/1997 | Parker et al. | |
| 5,631,704 A | 5/1997 | Dickinson et al. | |
| 5,642,238 A * | 6/1997 | Sala | 359/871 |
| 5,646,614 A | 7/1997 | Abersfelder et al. | |
| 5,661,575 A | 8/1997 | Yamashita et al. | |
| 5,670,935 A | 9/1997 | Schofield et al. | |
| 5,680,123 A | 10/1997 | Lee | |
| 5,699,044 A | 12/1997 | Van Lente et al. | |
| 5,765,940 A | 6/1998 | Levy et al. | |
| 5,793,322 A | 8/1998 | Fossum et al. | |
| 5,798,691 A | 8/1998 | Tim Kao | |
| 5,803,579 A | 9/1998 | Turnbull et al. | |
| 5,812,193 A | 9/1998 | Tomitaka et al. | |
| 5,836,676 A | 11/1998 | Ando et al. | |
| 5,865,529 A | 2/1999 | Yan | |
| 5,872,595 A | 2/1999 | Monahan | |
| 5,880,777 A | 3/1999 | Savoye et al. | |
| 5,895,115 A | 4/1999 | Parker et al. | |
| 5,904,330 A | 5/1999 | Manico et al. | |
| 5,938,717 A | 8/1999 | Dunne et al. | |
| 5,949,346 A | 9/1999 | Suzuki et al. | |
| 5,959,668 A | 9/1999 | Cryder et al. | |
| 5,995,145 A | 11/1999 | Viliesid | |
| 6,002,429 A * | 12/1999 | Ochi et al. | 348/220.1 |
| 6,037,976 A * | 3/2000 | Wixson | 348/122 |
| 6,038,496 A | 3/2000 | Dobler et al. | |
| 6,091,833 A | 7/2000 | Yasui et al. | |
| 6,115,651 A | 9/2000 | Cruz | |
| 6,151,065 A | 11/2000 | Steed et al. | |
| 6,175,300 B1 | 1/2001 | Kendrick | |
| 6,181,321 B1 * | 1/2001 | Zhao et al. | 345/617 |
| 6,246,933 B1 | 6/2001 | Bagué | |
| 6,259,475 B1 | 7/2001 | Ramachandran et al. | |
| 6,262,764 B1 | 7/2001 | Perterson | |
| 6,295,042 B1 | 9/2001 | Aoki | |
| 6,304,173 B2 | 10/2001 | Pala et al. | |
| 6,320,612 B1 | 11/2001 | Young | |
| 6,337,675 B1 | 1/2002 | Toffolo et al. | |
| 6,498,620 B2 * | 12/2002 | Schofield et al. | 348/148 |

FOREIGN PATENT DOCUMENTS

| | | |
|---|---|---|
| DE | 3916875 | 12/1990 |
| DE | 29620774 | 5/1998 |
| DE | 29806638 | 7/1998 |
| EP | 0087992 | 9/1983 |
| EP | 0244230 | 11/1987 |
| EP | 0417397 | 3/1991 |
| EP | 0573235 | 12/1993 |
| EP | 0625793 | 9/1998 |
| EP | 0689000 | 9/1998 |
| GB | 2313973 | 12/1997 |
| JP | 62 18775 | 1/1987 |
| JP | 62 235787 | 10/1987 |
| JP | 07-075022 * | 3/1995 |
| JP | 07 075022 | 3/1995 |
| JP | 9207664 | 8/1997 |
| JP | 02000222697 | 8/2000 |
| WO | 96 38319 | 12/1996 |
| WO | 97 17800 | 5/1997 |
| WO | 97 42756 | 11/1997 |

OTHER PUBLICATIONS

Yadid-Pecht, Orly et al., "Readout Schemes to Increase Dynamic Ranges of Image Sensors," *NASA Tech Briefs*, Jan. 1997 (2 pages).

Fossum, Eric R., "Low Power Camera-on-a-Chip Using CMOS Active Pixel Sensor Technology," *1995 Symposium on Low Power Electronics*, Oct. 9-10, 1995, San Jose, California (pp. 1-4).

Fossum, Eric R., "Active Pixel Sensors: Are CCD's Dinosaurs?," *SPIE*, vol. 1900 (pp. 2-14).

Mendis, Sunetra K., "Low-Light-Level Image Sensor With On-Chip Signal Processing," *SPIE*, vol. 1952, p. 23-33.

SAE J578, Surface Vehicle Standard—Color Specification, revised Jun. 1995.

English Translation "LED-Baulement" of 2087 Elektronic, vol. 44, No. 15, Jul. 25, 1995, p. 134.

J.L. Schnapf et al., "Spectral Sensitivity of Human Cone Photoreceptors," Nature, vol. 325, Jan. 29, 1987, pp. 439-441.

Brainard, David H., Colorimetry, XP 002040706, Chapter 26, pp. 26.1-26.53.

Hunt, R.W.G., *Measuring Colour*, reprinted in 1992 by Ellis Horwood Limited, pp. 28-79 and 124-133.

Photographs of a CHMSL of a 1995 Ford F150 Pickup Truck.
Photographs of a CHMSL of a 1996 Chevy Blazer.
Photographs of a CHMSL of a 1996 Chrysler Town & Country.
Patent Abstracts of Japan, vol. 095, No. 006, Jul. 31, 1995.
Patent Abstracts of Japan, vol. 1998, No. 04, Mar. 31, 1998 (Pub. No. 09320000 dated Dec. 12, 1997), 1 page.

Patent Abstract of Japan, vol. 018, No. 358, Jul. 6, 1994 (Pub. No. 06092184 dated Apr. 5, 1994), 1 page.
Patent Abstract of Japan, vol. 1997, No. 06, Jun. 30, 1997 (Pub. No. 09030326 dated Feb. 4, 1997), 1 page.

* cited by examiner

VEHICLE VISION SYSTEM

CROSS-REFERENCE TO RELATED APPLICATION

This application is a continuation of U.S. patent application Ser. No. 09/001,855 filed on Dec. 31, 1997 now abandoned, entitled "VEHICLE VISION SYSTEM," by Jon H. Bechtel et al., the entire disclosure of which is incorporated herein by reference.

TECHNICAL FIELD

The present invention relates to a vision system for vehicles.

BACKGROUND ART

Viewing systems are important to the proper operation of motor vehicles. Such systems must be capable of operating in a wide range of inter-scene brightness ranging from strong sunlight to moonlight. They must also perform well in a wide range of intra-scene brightness as may occur from viewing a nighttime scene containing car headlights. Still further, frame rates must be attainable so that the displayed view appears to be real-time.

Traditionally, vehicle viewing systems have used a plurality of mirrors to allow the operator to see objects behind and beside the vehicle. The use of mirrors has resulted in several difficulties, including blind spots due to opaque body structures, distortion due to convexity, inability to modify color balance for night vision, and wind resistance due to outside mounting.

Another difficulty with current vehicle viewing systems is an inability to properly display the intensity of a dimly lit scene. The human eye is much more sensitive to light when adapted to dimly lighted street and highway driving at night than in the daytime. Viewing relatively bright images, such as a display screen with a relatively high intensity, causes changes in the retina which substantially and subtly reduce visual sensitivity to dimly lit scenes. Following exposure to brighter lights, this effect reduces the perception of and resulting reaction time to dimly lit scenes.

Still another difficulty with current vehicle viewing systems is the inability to alter the balance between a dim and bright portion of a scene. For example, headlamps of a trailing vehicle are frequently annoying to a driver. The brightness obscures visibility of much or all of other features in the rearward field of view, and may be bright enough to further mask visibility in portions of the forward field of view. Electrochromic mirrors have eliminated most of the annoyance glare without darkening excessively but cannot alter the balance between dim and bright portions of the same scene and cannot effectively amplify the intensity of a dimly lit scene.

Yet another difficulty with current vehicle viewing systems is the inability to shift the color balance of a displayed scene in response to changing ambient light conditions. In particular, blue light is more damaging to night vision than red light.

To reduce these problems and others, vehicle viewing systems employing cameras and displays have been proposed. Typically, one or more cameras are mounted on the sides, roof or rear of the vehicle. The video output may be processed to blend the views from multiple cameras, extract distance information, and adapt to changing environmental conditions. One or more displays are used to present the raw or processed video data to the operator.

Consequently, a need exists to produce a vehicle viewing system with extended dynamic range capable of operating effectively across wide intra-scene and inter-scene brightness levels. The system must also reduce the effects of display glare and not subject the vehicle operator to light levels and color balances that might compromise night vision.

SUMMARY OF THE INVENTION

It is a primary object of the present invention to provide a system and method for viewing scenes around a vehicle in a variety of environmental conditions.

Another object of the present invention is to provide a system and method of displaying an image of a scene with minimal exposure of the driver to high display light levels and glare which may impair night vision.

Another object of the present invention is to provide a system and method of displaying an image of a scene with appropriate color balance to prevent compromising the night vision of a driver.

Another object of the present invention is to provide a system and method for viewing details in scenes that may be obscured due to dim lighting or masked by bright light sources.

Still another object of the present invention is to provide a system and method for viewing scenes with wide inter-scene brightness levels.

A further object of the present invention is to provide a system and method for viewing scenes with wide intra-scene brightness levels.

In carrying out the above objects and other objects and features of the present invention, a system is provided that includes a camera system to generate a signal corresponding to the scene by integrating light from the scene incident on pixel cells having a variable integration time, a display system to present a visual representation of the scene, and a processor system to determine the camera system integration time based on brightness levels in the scene.

In an embodiment, the camera system includes an optical sensor, a lens system for focusing an image of the scene onto the optical sensor, and a variable input attenuation filter for limiting the light from the image which strikes the optical sensor. The optical sensor is preferably comprised of an array of photogate CMOS active pixel sensors cells. Support electronics allow for a plurality of architectures including double integration, dual integration, interlacing, and individual cell pixel reset. The variable input attenuation filter may be implemented with an electrochromic window. The camera system may include a digitized output.

In an embodiment, the processor system is operable to determine camera and display system settings. The processor system may include an image brightness detector to determine measures of overall image brightness and a display pixel luminance mapping control to determine luminance settings for the display system. The processor may be further operable to accept inputs from ambient light sensors, direct glare sensors, and manual intensity adjustments for determining display intensity.

In an embodiment, the display system includes a display and a display variable attenuation filter for limiting the light emitted from the display. The display variable attenuation filter may be implemented with an electrochromic window.

In an illustrative embodiment, the image brightness detector determines a histogram of brightness values in image frames.

In another illustrative embodiment, the display pixel luminance mapping control is implemented with a memory accepting an address formed from an image brightness histogram and individual image pixel brightness values and producing a corresponding display pixel luminance value.

The above objects and other objects, features, and advantages of the present invention are readily apparent from the following detailed description of the best mode for carrying out the invention when taken in connection with the accompanying drawings.

BEST MODES FOR CARRYING OUT THE INVENTION

Figure 1:
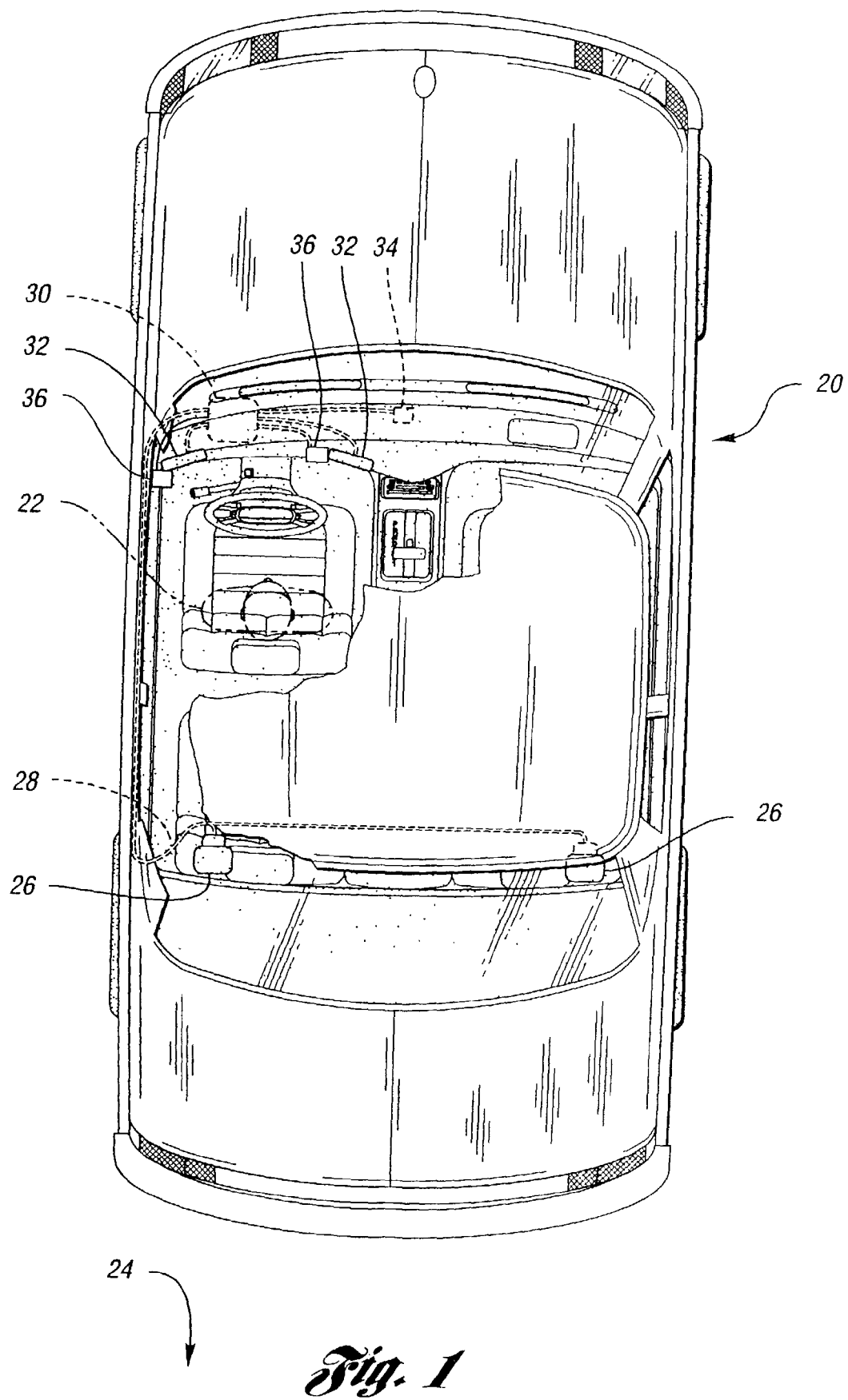
FIG. 1 is a general schematic diagram of a vehicle including the present invention.

Referring now to FIG. 1, a schematic diagram of the present invention is shown. Vehicle 20 is driven by operator 22. One or more camera systems 26 are operative to view a scene 24. In the example shown, scene 24 is generally behind vehicle 20. Of course, however, camera system 26 may be oriented in a variety of ways to view scenes at other locations about vehicle 20 including, but not limited to, the sides, back, front, bottom, top, and inside. In the example shown, signals representative of the scene are sent via channel 28 to a processor system 30. Input from an ambient light sensor 34 and direct glare sensor 36 is also available to processor system 30. Processor system 30 produces an enhanced image of scene 24 on one or more display systems 32.

In a particularly useful embodiment, a conventional mirror system is augmented by camera systems 26 which cover a wide field of view to the back and sides so that pedestrians or other objects directly back of vehicle 20 may be seen and so than oncoming traffic from the sides may be seen. The system is designed so that, when backing out of a parking spot, oncoming vehicles may be seen before backing into the lane of travel. This requires camera system 26 with a near 180° field of view or several camera systems 26 mounted near the rear of the vehicle. An analogous system with a camera or cameras mounted near the front of the vehicle is adapted to view cross traffic at a "blind" intersection before entering the lane of travel of the cross traffic. These are desirable applications for the present invention which supplement the viewing function of conventional rearview mirrors.

Figure 2:
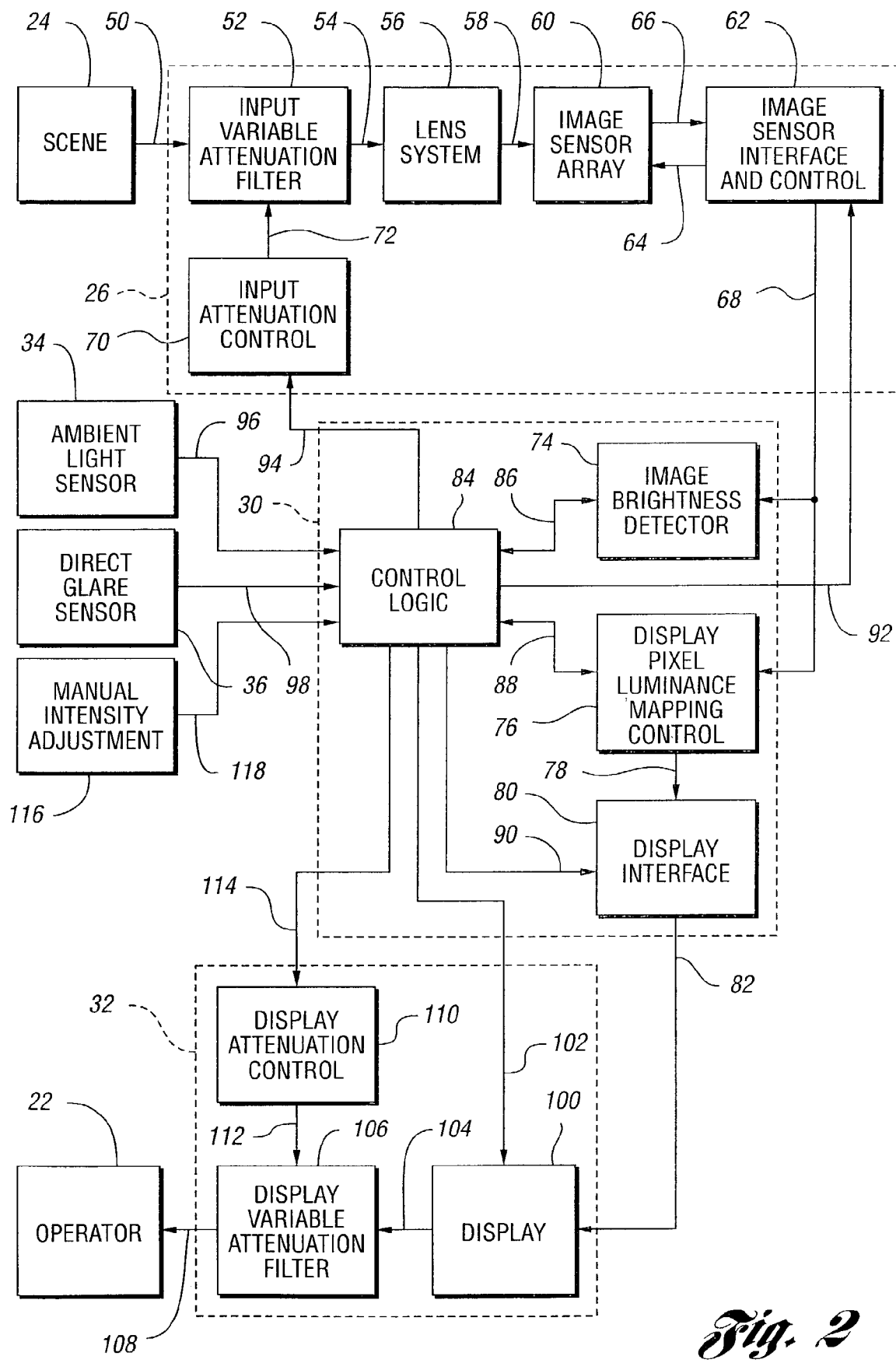
FIG. 2 is a block diagram of a preferred embodiment according to the present invention.

Referring now to FIG. 2, a block diagram of a preferred embodiment according to the present invention is shown.

Camera System

Camera system 26 accepts image rays 50 from scene 24. Image rays 50 pass through optional input variable attenuation filter 52 emerging as attenuated image rays 54. Rays 50 or 54 are focused by lens system 56, becoming focused rays 58. An image sensor array 60 is placed in the focal plane of lens system 56. The image sensor array is comprised of individual pixel sensors, ideally arranged in rows and columns. An image sensor interface and control unit 62 provides control signals 64 to image sensor array 60 and receives electrical signals 66 corresponding to scene 24 from image sensor array 60. Image sensor interface and control 62 may operate on signals 66, preferably including digitizing the signals, prior to forwarding the camera system output signals 68. If optional lens attenuating filter 52 is used, the amount of attenuation is controlled by lens attenuation control 70 through lens attenuation filter signal 72.

In a preferred embodiment, camera system 26 is designed to handle a large dynamic range. A significant improvement over prior systems is the ability of camera system 26 to capture and transmit detail in scene 24 that has previously been obscured due to low illumination levels or due to glare from lights such as headlamps.

One limitation on the dynamic range of camera system output is due to the pixel sensors in the image sensor array. A preferred embodiment uses complimentary metal-oxide semiconductor/metal-on-silicon (CMOS) photogate active pixel sensor (APS) cells. The photogate in each cell is used to integrate charge developed from incident light. A storage site is capable of holding the integrated charge. The storage site can be reset to a reference level indicative of pixel sensor noise. A selectable buffer circuit outputs a signal proportional to the integrated charge or reference value at the storage site. By subtracting the reference noise signal from the integrated charge signal, a significant effect of the noise can be eliminated, increasing pixel sensor sensitivity.

Another limitation on the dynamic range of camera systems has been the restriction on the length of time for integrating charge produced by incident light. Current systems limit the integration time to slightly less than the frame time. Since it is desirable to display scene 24 as near real-time, a high frame rate of preferably not less than 30 frames per second is required. Traditionally, this has resulted in integration times of no greater than 33 milliseconds.

An optical sensor combining image sensor array 60 and image sensor interface and control 62 with a wide dynamic range is described in pending U.S. Pat. No. 6,008,486 entitled "WIDE DYNAMIC RANGE OPTICAL SENSOR" to Joseph S. Stam et. al. and is hereby incorporated by reference. One method described implements a double integration architecture by using storage in each pixel cell to hold the charge integrated from the previous frame period while integrating charge for the current frame period. By summing the signals representing charge integrated during the current and previous frame periods, a signal is produced that has an effective integration time of twice the frame period.

A second method described by Stam et. al. uses an interlacing architecture to read a subset of pixel sensors each frame period. Those pixel sensors not read in a given frame period continue to integrate light-induced charge. By reading each pixel sensor at a period that is a multiple of the frame time, an effective integration time greater than the frame time is achieved. Values representing pixel cells not read in a given frame period may be interpolated from neighboring pixel cells which are read.

A third method described by Stam et. al. uses a dual integration architecture to provide two integration signals. A first signal is generated by integrating charge over a relatively long period. This charge is then stored in the pixel sensor cell. A second signal is generated by integrating charge over a relatively short period. If a signal corresponding to the long integration period is less than a threshold, the long integration signal is used as the output. If the long integration signal is not less than a threshold, the short integration signal is used. This provides an output signal with greater resolution at low light levels while still covering a wide range of brightness.

A fourth method described by Stam et. al. uses individual pixel resets to extend the effective dynamic range. In this method, individual or groups of pixel sensors can be reset during the integration time, thereby providing a shorter integration period. Areas of the image of scene 24 that are dimly lit receive longer integration periods than areas that are brightly lit. Using this technique, the bright headlamps of a trailing vehicle in scene 24 are locally sensed at a much lower sensitivity so that saturation in the corresponding portion of the image is reduced or eliminated while still sensing the remainder of scene 24 with sufficient sensitivity. This allows viewing of detail which has heretofore been obscured by bright headlamps. Since there are frequently only two headlamps causing most of the glare in the field of view of scene 24 and since the image of each headlamp projects a small sized area typically striking at most a two-by-two pixel sensor area, the capability to position as few as two reduced integration time windows of standard size, such as, for example, three-by-three pixel sensors, can yield considerable benefit in control of brightness in the image of scene 24.

In a more sophisticated embodiment, additional perhaps variable sized reset windows can be used to reduce the integration times for portions of image 24 corresponding to reflection and glare. The ability to dynamically adjust reset window position and reset time will be provided. The method of controlling the reset period for a pixel sensor is described in "Image Sensors With Individual Pixel Reset," page 34 of NASA Tech Brief NPO-1973 of November 1996 by Pecht, Pain, and Fossum.

The four methods described in Stam et. al. can be implemented in the same optical sensor. Control inputs determine which methods are in use, the integration times, and the reset times.

Even with an image sensor array 60 possessing a relatively large intra-scene dynamic range, the ambient light level over which camera system 26 must operate is likely to be greater than can be accomplished solely with the image sensor 60. For example, there should be some visibility even in bright moonlight, and the ratio between the intensity of bright sunlight and bright moonlight is roughly 1,000,000 to one. Thus, there must be one or more methods to increase the range over which image sensor 60 can be used well beyond that provided by the wide intra-scene dynamic range of image sensor 60. To accommodate such wide inter-scene variations in lighting conditions, variable attenuation filter 52 can be used. In one embodiment, a lens with an automatic variable iris is used. However, such mechanisms are presently expensive and a lens system 56 adapted to work with an iris is likely to require more elements, working against the requirement for exceptionally high contrast and low light dispersion required to make the large dynamic range possible as described below. It is thus preferred to use a lens which has a fixed aperture. Input attenuation filter 52 may also be implemented as an electrically controlled shutter.

In the preferred embodiment, input attenuation filter 52 is implemented with an electrochromic window. The window transitions from substantially clear to maximum attenuation based on attenuation filter signal 72. The steady state attenuation is a reasonably stable and reproducible function of voltage so that, having experimentally determined the relationship between voltage and light attenuation, a controller may be used to set the amount of attenuation. This allows camera system 26 to employ a highly sensitive image sensor array 60 without excessive saturation in bright daylight. The use of an electrochromic window for implementing filter 52 is described with regards to FIG. 6 below.

A digital output from camera system 26 is desired. Image sensor interface and control 62 may use an 11- or 12-bit analog-to-digital converter (ADC) to read the pixel output which indicates the respective integrated light level received at the pixel sensor sites.

An alternative embodiment to the above ADC is a multi-range ADC having fewer bits. A dual or multiple ranging scheme may also be used including a digitized value and a range indication. For example, a dual integration architecture may be implemented in image sensor array 60. Two different integration periods where one may be, for example, eight times as long as the other, may be used. For each pixel, if the reading with the longer integration is in a range which would not cause a full scale ADC readout value, it is digitized with, for example, an 8-bit converter. Nine bits consisting of the 8-bit digitized value along with a range indication bit set to indicate the longer integration period are provided as camera system output signal 68. Otherwise, when the light level at the pixel sensor is too high for the long integration period, the reading for the short integration period is digitized and this 8-bit value along with a range indication bit set to indicate the short integration period are output as signal 68. Particularly in this configuration, the values each consisting of a magnitude and a range indicator are not in a good form to send to display system 32 and in either this configuration or the 11- or 12-bit ADC, the total brightness range will be more than 2000 to one if linearly reproduced on a display.

A further non-linear ADC embodiment utilizes a logarithmic preamplifier or logarithmic converter to provide a greater density of quantization levels at low light levels than at high light levels.

Camera system 26 with a wide dynamic range places strict requirements on lens system 56. Some percentage of the light which emanates from a bright portion of scene 24 strikes lens system 56 and is scattered by the optical surfaces of the lens. Some percentage of this scattered light either directly or through further interactions with components in camera system 26 ends up striking image sensor array 60 in an otherwise dimly lighted portion of the image. Another portion of the light which strikes a refracting or diffracting optical surface is reflected off of the surface. In many cases, this is an unwanted reflection and a portion of this light may also end up striking an otherwise dimly lighted portion of the image. The problem is exacerbated by the need for high low-light sensitivity which necessitates the use of a relatively fast lens, for example, one with an f number rating of f2 or lower and preferably in the range of f1.

To perform well, lens system 56 needs to have as few optical surfaces as practical and the refracting surfaces must be coated with anti-reflection coatings. The requirement to minimize the number of optical surfaces suggests the choice of a lens with one or more aspheric surfaces. Since scattering is a problem with diffractive optics, the requirement suggests that the lens choice should be limited to one with refracting or reflecting and not diffracting optical elements.

Processor System

Referring again to FIG. 2, processor system 30 is further described. The camera system output 68 is processed by image brightness detector 74 and display pixel luminance mapping control 76. Image brightness detector 74 may determine the brightness level of the entire image and may determine brightness levels of regions within the image. Display pixel luminance mapping control 76 may compress the wide dynamic range of camera system output 68 to one which is comfortably viewable by operator 22. Display pixel luminance mapping control 76 may also increase the visibility of scene 24 while limiting higher light levels which are detrimental to the night vision of operator 22. Display luminance signal 78 is processed by display interface 80 to produce display signal 82 for display system 32. Control logic 84 is in communication with image brightness detector 74 through bus 86, display pixel luminance mapping control 76 through bus 88, display interface 80 through bus 90, image sensor interface and control 62 using image sensor control signal 92, input attenuation control 70 using input attenuation control signal 94, and other elements as will be described forthwith.

In image brightness detector 74, camera system output signal 68 is sampled to obtain digitized pixel readings. From these samples, control logic 84 computes and frequently updates the average pixel brightness in the frame and also updates the number of pixels which are at maximum brightness and minimum brightness in an image frame. Control logic 84 may periodically send control signals 92 to image sensor interface and control 62 to adjust the integration time so that the desired average image brightness in camera system output signal 68 is maintained. In another embodiment, the standard deviation of the brightness in camera system output signal 68 over a frame can be computed.

In a further embodiment, the integration period and the resulting average brightness are decreased when too high a percentage of pixels are at their maximum brightness level. Additionally, when few pixels are saturated but a larger percentage is at minimum brightness, the integration period is increased to raise the average brightness. When scene 24 is too bright to adequately control the overall brightness of camera output signal 68 using integration period alone, input variable attenuation filter 52 is darkened using input attenuation filter signal 72 to provide the desired degree of added attenuation. An illustrative embodiment of image brightness detector 74 is described with regards to FIG. 3 below.

Camera sensitivity is controlled over a wide range of brightness primarily by changing the integration time and method in order to reasonably center the image exposure in the electrical readout range of the pixel sensors and associated electronics. This balance is approximately maintained through display pixel luminance mapping control 76 so that, without further adjustments, the average display brightness will remain nearly constant. This is not sufficient to control the intensity of display system 32, however, since the display must be much brighter to be seen in the day than in the night. Furthermore, in spite of compression and the effective limiting of the displayed level of brighter headlights, the displayed image of scene 24 still has a large dynamic range which may, for example, be 200-to-one. For operator 22 to continue to see this range of brightness without being far too bright at night, the average intensity of display system 32 will have to be adjusted over a very large range and the adjustment will have to be well characterized to what is required. Any system which provides only two settings such as, for example, a high intensity level with headlamps off and a low intensity level with headlamps on, will be highly inadequate. An important consideration in control of the intensity of display system 32, particularly in low ambient light conditions, is that the maximum and average intensities should be maintained at levels which are generally as low as reasonable to convey the required information so that the subsequent ability of operator 22 to discern and respond to dimly lit images is not unnecessarily compromised.

An embodiment has the intensity of camera system 26 adjusted in inverse proportion to the camera sensitivity setting. The integration time calculated in processor system 30 forms the basis for determining the brightness setting. A lookup procedure can then be used to convert the integration time to a brightness setting based on display type, display mounting relative to operator 22, vehicle 20 lighting conditions, and other factors. A modification would use averages of integration times to stabilize brightness settings.

Another embodiment has the intensity of display system 32 leveling off to a minimum threshold at approximately the light level for which the integration period is at a maximum (i.e., camera system 26 is at maximum sensitivity). Under these conditions, scene 24 is likely to be dimmer than operator 22 can see in a normal mirror so that the displayed image must be enhanced over levels which would otherwise approximate the brightness of the scene being imaged.

Still another embodiment can be used when the lights of a trailing vehicle are adding significantly to the average rearward light level. Camera system 26 will be adjusted for lower sensitivity and, under the method of the first improvement, display system 32 will therefore be set to a higher intensity level. This higher intensity level may be too high for the forward ambient light level to which the eyes of operator 22 have become adjusted. To compensate, a second average light level is calculated omitting the values from brighter pixels. The second average is compared to a first average of all pixels and, if the second average is substantially lower than the first average, the display intensity may be reduced to correspond more nearly to the level obtained when the bright light sources are not included.

Still another embodiment for controlling the intensity of display system 32 uses a non-linear approach based on output from camera system 26 with a dual integration architecture. Control logic 84 forms a number from the data value and range (short or long integration time) indication. This number is used as an index into a lookup table to obtain the display intensity setting. The magnitude of the intensity output for the condition where strong brightness is present should be an approximately logarithmic function of the magnitude of camera system output signal 68 brightness. This embodiment is further described with regards to FIGS. 4 and 5 below.

Still another embodiment for controlling the intensity of display system 32 uses frame-based image processing. Various regions of a frame are examined and the local intensity is adjusted based on localized spatial characteristics of the scene. For example, brightness levels in brighter zones may be scaled down. Also, areas surrounding bright lights might be compressed differently and more severely than other areas in the image. Also, if an analysis show the lighting to be very flat, particularly when headlamp glare is not present, the compression may be eliminated or brightness expansion may be used to increase contrast and help definition of detail.

Yet another embodiment for controlling the intensity of display system 32 uses ambient light signal 96 from forward facing ambient light sensor 34. The eyes of operator 22 are adapted mainly to the average light level within a generally forward facing field of view. A time average of ambient light signal 96 may be used to provide an indication of the ambient level seen by operator 22. Ambient light signal 96 may be used in place of or in addition to sensitivity settings of camera system 26 to program the average intensity of display system 32 between a minimum threshold at low ambient light levels and a high threshold for high ambient light levels. The use of forward facing ambient light sensors are described in U.S. Pat. No. 4,917,477, entitled "AUTOMATIC REARVIEW MIRROR SYSTEM FOR AUTOMOTIVE VEHICLES" to Jon H. Bechtel et. al. and hereby incorporated by reference.

A further embodiment for controlling the intensity of display system 32 uses glare signal 98 from direct glare sensor 36. Direct glare sensor 36 is placed so as to sense light levels falling on display system 32 which may be excessive relative to the prevailing ambient light condition. The intensity of display system 32 may be increased form the otherwise normal level when these conditions are present to prevent washout.

A still further embodiment does not require extensive calculations and may be used as a stimulus to alter the intensity of display system 32. When proportions of saturated and dark pixels are both small, an image of lower contrast is indicated and a lower degree of compression or expansion may be used.

Yet a further embodiment for stimulating the modification of display system 32 intensity is to estimate or determine the standard deviation of brightness over the image frame.

In a preferred embodiment, all of the above embodiments for controlling the intensity of display system 32 are incorporated.

Image brightness detector 74, display pixel luminance mapping control 76, and control logic 84 are closely related. Either or both of detector 74 and luminance mapping control 76 may be partially or completely merged into control logic 84. Further control logic 84 may modify camera system output 68 prior to use in either detector 74 or luminance mapping control 76. This modification could include filtering and feature extraction.

Display System

Referring again to FIG. 2, display system 32 is further described. Display signal 82 from display interface 80 is fed to display 100. Display rays 104, generated by display 100, pass through optional display variable attenuation filter 106 and emerge as filtered display rays 108. Filtered display rays 108 representing scene 24 are viewed by operator 22. If optional display attenuating filter 100 is used, the amount of attenuation is controlled by display attenuation control 110 through display attenuation filter signal 112.

Display 100 may be implemented with a number of different technologies, including cathode ray tubes (CRT), field emission displays, and back lit liquid crystal displays (LCD). Display 100 is preferably full color but, due to current cost constraints and difficulties with color displays at low brightness levels, a monochrome display may be used. As a compromise, a two-color display designed to appear reasonably natural while allowing operator 22 to distinguish red tail lamps from headlamps or blue emergency signals from amber turn signal lamps may be used.

Many displays do not have the brightness range necessary to cover a good dynamic range within one frame in addition to a very large total brightness range for use in ambient light conditions which range from darkness to bright sunlight. To reduce the requirements on display 100, a display variable attenuation filter 106 may be used. In the preferred embodiment, attenuation filter 106 is implemented with an electrochromic window. The attenuation filter is controlled by processor system 30 through display attenuation control signal 114. A method for controlling filter 106 is described with regards to FIGS. 6 and 7 below.

Control of the intensity of display system 32 may be done solely with display attenuation filter 106, with control of display 100 brightness or, in the preferred embodiment, with a combination of both techniques.

To compensate for variations in preferences of individual operators, a manual brightness adjustment 116 can be included. Manual brightness signal 118 is used by processor system 30 to modify calculated brightness levels. Optionally, a brightness control built into display 100 may be used as a supplement or alternate to display pixel luminance mapping control 76. However, some automatic brightness adjustment is likely to still be required to meet the widely varying requirements of vehicle ambient lighting conditions.

In addition to controlling the brightness of rays 102 from display system 32, it is desirable to control the color in low-light conditions. Studies have indicated that blue light is more disruptive than red light to human night vision. If display 100 has full or partial color, it may be advantageous to modify the color balance in rays 104 observed by operator 22 in low ambient light conditions. One method is to vary the color balance of display 100 so as to shift displayed color away from the shorter blue wavelengths. Another method is to provide a blue blocking filter in display variable attenuation panel filter 106 such that, as the amount of attenuation increases in filter 106, the shorter wavelength visible light is attenuated to a greater extent than longer wavelength visible light. Both methods may be implemented in the same system.

The system described in FIG. 2 may be implemented as hardware, software, or a combination of both. Signal paths may be implemented as discrete wiring, optical cabling, buses, and other channels and mediums as is well known in the art. Buses may be implemented as serial or parallel connections, and various buses may be combined. Furthermore, elements described may be combined or further partitioned within the spirit and scope of this invention.

Image Brightness Detector

Figure 3:
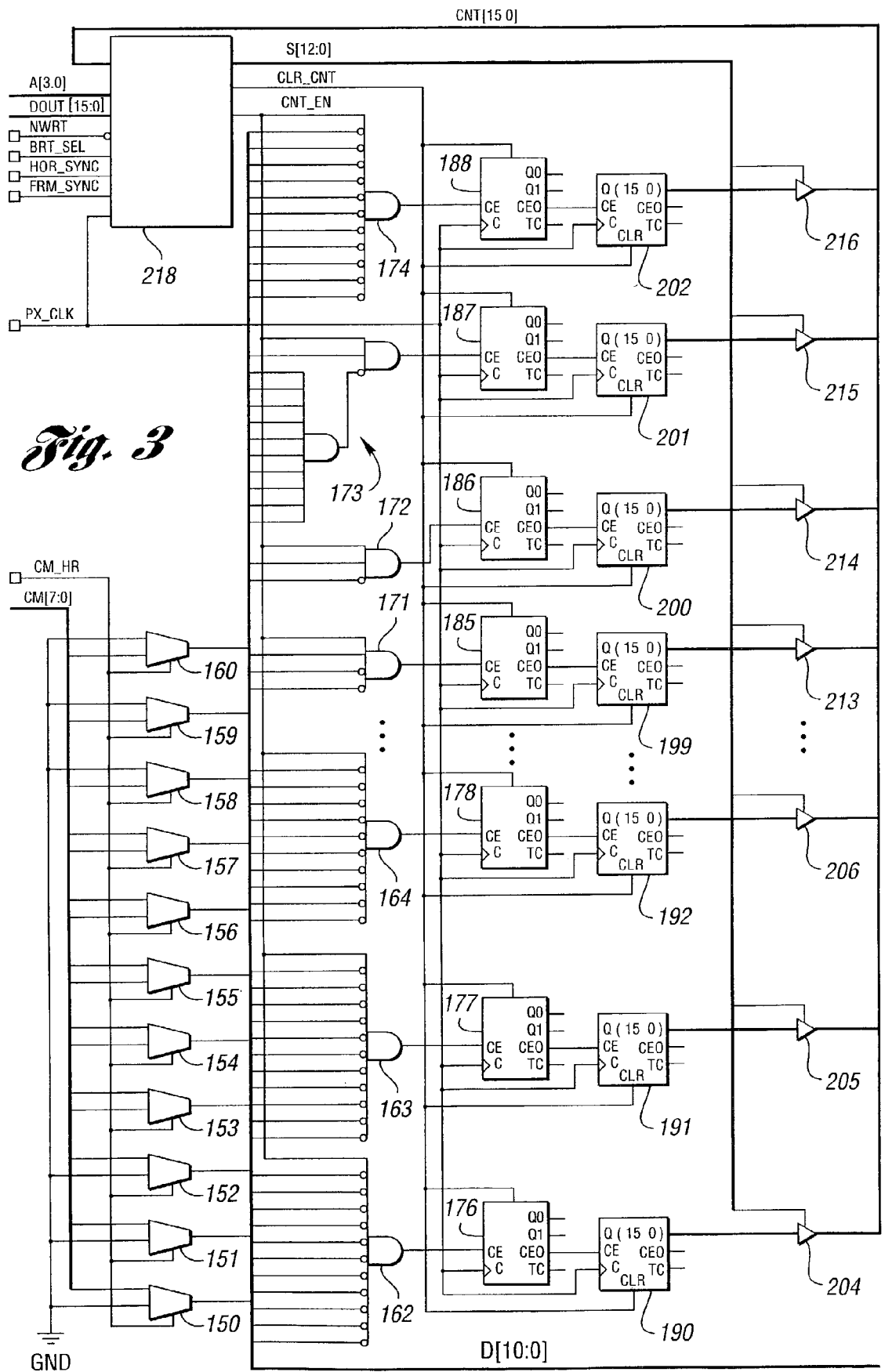
FIG. 3 is a schematic diagram for implementing an image brightness detector according to the present invention.

Referring now to FIG. 3, a schematic diagram for implementing image brightness detector 74 according to an embodiment of the present invention is shown. For this illustrative embodiment, camera system 26 implements a dual integration architecture with an eight-to-one ratio between long and short integration times. Light incident on each pixel sensor is represented by an 8-bit illuminance value plus an additional bit indicating whether long or short integration was used. Effectively, this results in an 11-bit illuminance value for which approximately one-quarter of the possible 2048 numbers can be produced. Image sensor array 60 has a 320 by 240 pixel sensor array. For this illustrative embodiment, display 100 accepts an 8-bit luminance value.

The circuit described generates a histogram which includes the number of saturated pixel cells, the number of dark pixel cells, and the number of pixel cells in a set of ranges between dark and saturated, each range spanning twice the brightness values of the previous range as will be further described below. Counters are used to accumulate the number of values in each range for a frame period. The corresponding counts each represent the height of a respective bar on a hypothetical histogram which is representative of the data collected. Since the data is partitioned into counts, it is also sometimes convenient to consider the counters and the associated ranges as bins so the terms "counts and associated ranges," "bins," and "histogram bars" will be used interchangeably. There are eleven bins for the non-zero, non-saturated, two-to-one light level ranges, one bin for the saturated range, and one bin for the zero or dark range. Other ranges besides two-to-one may be selected and the bins do not have to cover equal light level ratios. The two-to-one difference in adjoining bins was chosen mainly because of the relatively simple decoders needed to enable the counts for each of the histogram bars based on the linear, binary encoding of the pixel illuminance readings. The selection of equal ratios for each of the histogram bars also has the advantage that such bins are of equal width on a logarithmic plot. Changing the exposure of the camera changes the readings by equal percentages which shifts them by equal increments on a logarithmic scale and thus by equal fractions of a bin width. Therefore, changes in exposure tend to translate rather than to materially alter the shape of the histogram curve. This is a convenient feature for the camera exposure control function. In an alternate embodiment, the bin ranges are chosen as equal increments on a linear scale.

The information from the thirteen counters which register the histogram is read by control logic 84 where it may be analyzed and used as the sensed variable in a feedback loop to control the integration time of image sensor array 60 and to set the optional input variable attenuation filter 52 to establish the proper camera exposure. The histogram may also be used to set the operating characteristic of display pixel luminance mapping control 76 so as to dynamically select the function which controls the mapping of the camera pixel illuminance reading onto the display pixel luminance level for the corresponding displayed pixel. It should be understood here that if the mapping of camera pixel cell output to display pixels is not one-to-one, then the functional correspondence for this mapping would be altered to apply to the mapping of the illuminance of an element of the scene recorded by the camera to the luminance of the corresponding element on the display.

In this illustrative embodiment, the camera covers a range of non-saturated and non-zero readout between 1 and 2046, whereas the display has an 8-bit non-zero, non-saturated range between 1 and 254 which is likely to result in even less than the 254-to-1 range in pixel luminance on the display screen. As will be described in more detail below, the camera exposure is adjusted so that, when adequate light is available, the image exposure is generally made as high as possible just short of saturating an undesirable high number of the pixel illuminance readings. This has the advantage of providing the greatest resolution for pixels in the readout range of the camera and also of clipping the often over-bright light levels from pixels which are saturated. For example, enough saturated pixels would normally be tolerated to allow the saturation of the very few pixels on which the image of the headlamps of a trailing vehicle have been projected.

Having established the exposure which tends to push the histogram toward the high end of the range, the lower extent of the histogram, which includes a substantial number of non-zero pixel readings, is determined. This is the lower extent of the camera pixel illuminance range which should be mapped to the display. If all 2046 camera pixel illuminance levels were mapped to the display when the scene itself does not posses a very high contrast, the contrast of the displayed scene would be very low and detail would be lost, appearing "washed out" on the display. Thus, the available mapping function with the highest contrast which spans the range from the lower illuminance pixels as determined above to the highest non-saturated pixel readings should be used. The available mapping functions should, in turn, include a reasonable range of contrast levels without being so extreme on either the high or low contrast ends of the scale so as to yield display images which are more difficult rather than easier to interpret.

There are two basic cases of pixel illumination distribution when the light level from scene 24 is so low that the camera is at its maximum exposure level. In the first and generally less common case, the pixel illumination distribution has a pattern with the majority of pixels lying a significant distance from both the saturated and the zero reading ends of the histogram distribution. In this case, mapping functions, which clip or compress both the highest and the lowest camera readings, may be used.

In the second case, the light level is so low that the distribution extends to the low end of the camera sensitivity range. In this case, the upper extent of the histogram range, which contains an appreciable number of pixels, is determined. This is the higher extent of the pixel illuminance range which should be mapped to the display. Thus, the available mapping function with the highest contrast which spans the range from the higher illuminance pixels as determined above to the lowest non-saturated pixel readings should be used. Such mapping functions are described with regards to FIG. 5 below.

The present invention may be used either with a black and white camera or with a color camera, in which case the encoding should preferably be of the type for which the camera pixel illuminance and display pixel luminance are indicated by one component of the video signal and the color by other components. In this form, the processing described above is applied to the illuminance component from the camera and the color components are preferably left unaltered.

Note that, where possible with the exemplary display, the full 8-bit brightness range is used to show variations of illuminance within the scene. Even then, the wide dynamic range of the camera must often be compressed. It would be unsatisfactory to additionally use the 8-bit pixel luminance control to vary the overall display intensity over the wide range needed for satisfactory viewing over the huge range in ambient light level encountered in driving. Thus, the primary control of the overall display brightness is handled by other methods which may include variation in back lighting intensity for a transmissive display, variation in accelerating potential for a cathode ray tube or other form of emissive display, or by use of a variable attenuation filter 106 for the display. These methods along with others may be used separately or in combination, in which case the processor determines the cumulative effect and apportions display control signal 102 and display attenuation control signal 114 accordingly to achieve the required viewing brightness of the display. This does not rule out use of pixel luminance to control the brightness but only emphasizes the fact that most displays do not have the dynamic range to adequately combine control of both the scene luminance range and the overall luminance level of the display into the one controlling mechanism.

Referring again to FIG. 3, eleven data selectors 150 through 160 receive the camera pixel illuminance reading as an 8-bit reading CM[7:0] plus multiplication factor of eight high range indication CM_HR and output an 11-bit value to data bus D[10:0]. When CM-HR is not asserted, the long integration time is indicated and the eleven data selectors 150 through 160 route CM0 to D0, CM1 to D1, etc. through CM7 to D7 and route 0's to D8, D9, and D10 so as to form the 11-bit value

000 CM7 CM6 CM5 CM4 CM3 CM2 CM1 CM0.

When CM_HR is asserted, the short integration time is indicated and data selectors 100-110 route ones to D0, D1, and D2 and route CM0 to D3, CM1 to D4, etc. through CM7 to D10 so as to form the 11-bit value

CM7 CM6 CM5 CM4 CM3 CM2 CM1 CM0 111.

This approximately implements the factor of eight multiplication so that the signal D[10:0] is an 11-bit linear encoding of the pixel illuminance level. Note that there are gaps in this range and ones are routed to D0, D1, and D2 for the high range so that the full-scale value is all ones.

The logic indicated by 162 through 174 implements decoding of the values on bus D[10:0]. The output of logic 162 is asserted when D10 through D0 are all 0, indicating a dark pixel cell. The output of logic 163 is asserted when D10 through D1 are 0 and D0 is one. The output of logic 164 is asserted for the two cases when D10 through D2 are 0 and D1 is one. The output of logic 165, not shown for clarity, is asserted for the four cases when D10 through D3 are 0 and D2 is one. Logic circuits 166 through 172 are similar, with the output of logic circuit 172 being asserted for the 512 cases when D10 is 0 and D8 and D9 are 1. The output of logic 173 is asserted for the 1023 cases where D10 is one and at least one of D9 through D0 is 0. The output of logic 174 is asserted when all of D10 through D0 are one, indicating a saturated pixel cell.

The logic circuits 162 through 174 are shown to handle a full range of 11-bit input values. Some simplification is possible if the gaps in the input range are taken into account. Also, depending on the implementation, data selectors 150 through 160 and logic 162 through 174 may be merged into an optimized logic block. In the embodiment shown, the 11-bit linear value on D[10:0] is available and may be routed to other functions such as display pixel luminance mapping control 76 in cases where the expanded linear form is more convenient than the eight bits plus range select form.

The results from the decoding logic are used to increment counters implementing histogram bins. For example, the output of logic 174 is connected to 2-bit (divide-by-four) prescale counter 188 so as to enable the count of saturated pixels to be incremented by the pixel clock, PX_CLK. The overflow of prescale counter 188 is connected to 16-bit binary up counter 202 so as to enable the 16-bit counter to be incremented by pixel clock PX_CLK once every four values received by the prescale counter.

The maximum bin count for this illustrative embodiment is 76,800, resulting when all values from the 320 by 240 pixel sensor fall within the same bin. Since the maximum value in signed 16-bit arithmetic is 32,767, the divide-by-four prescaler limits the maximum counts to a reasonable range. Prescaler 188 is preferably preset to binary 11 when counter 202 is reset prior to accumulating the count over one frame. In this way, the prescaler overflows on and thereby registers the first count in the counter 202. This is useful since most of the light from a single headlamp may be projected on one pixel and a counter with the preferred prescaler will not miss this single count. Buffer 216 is enabled by assertion of address signal S12 to transmit the count to the bus CNT[15:0] for readout by controller 218.

There are a total of 13 similar counters 190 through 202. The middle group of six, 193 through 198, is not depicted in FIG. 3 for clarity. Each counter is enabled to count pixels in its respective range and each may be read by controller 218. The respective pixel illuminance ranges for counters 160 through 202 are: 0, 1, 2-3, 4-7, 8-15, 16-31, 32-63, 64-127, 128-255, 156-511, 512-1023, 1024-2046, and 2047.

A signal from control logic 84 to controller 218 causes the momentary assertion of a counter initialization pulse on CLR_CNT to clear the counts and initialize the prescalers to register the first count. Controller 218 further responds by asserting count enable signal CNT_EN for exactly one frame period beginning at the first ensuing frame sync pulse and ending at the following frame sync pulse on FRM_SYNC.

Control logic 84 sends an address on A[3:0] with a read instruction in response to which controller 218 responds by asserting the corresponding line for the selected counter on S[12:0] and gating the count returned on CNT[15:0] to DOUT[15:0] from which it is read by control logic 84.

In an optional embodiment, the function of controller 218 may be expanded to additionally use the HOR_SYNC signal to count rows in the frame and to thereby select bracketed horizontal bands of the frame over which to record individual histograms. It may be particularly advantageous to evaluate a histogram which does not include the upper portion of the image which may be viewing large portions of the sky. The sky may be brighter than the rest of the image, which is most likely to contain information most useful to operator 22.

Referring now to FIGS. 2 and 3, horizontal sync HOR_SYNC, frame sync FRM_SYNC, pixel clock PX_CLK, and the nine signals encoding the pixel illuminance CM[7:0] and CM_HR as shown in FIG. 3 are depicted by line 68 of FIG. 2. Address lines A[3:0], output data bus DOUT [15:0], active low write enable NWRT, and image brightness detector control select signal BRT_SEL in FIG. 3 are, in FIG. 2, bus 86 which links control logic 84 to image brightness detector 74.

Some cameras output a substantial number of non-zero, low value readings even when the scene is completely dark. Thus, there may be residual counts particularly in counter 191, which counts pixels with an illuminance reading of 1, and perhaps also in counter 192, which counts illuminance readings of 2 and 3. These dark reading counts should be recorded or estimated and taken into account so that it is not always assumed that a substantial number of pixels are illuminated at these levels during low light conditions.

The logic described with respect to FIG. 3 may be implemented as discrete logic, programmable arrays, custom integrated circuits, software, or any combination of the above. Blocks may be combined or further divided within the spirit and scope of the present invention.

Display Pixel Luminance Mapping Control

Figure 4:
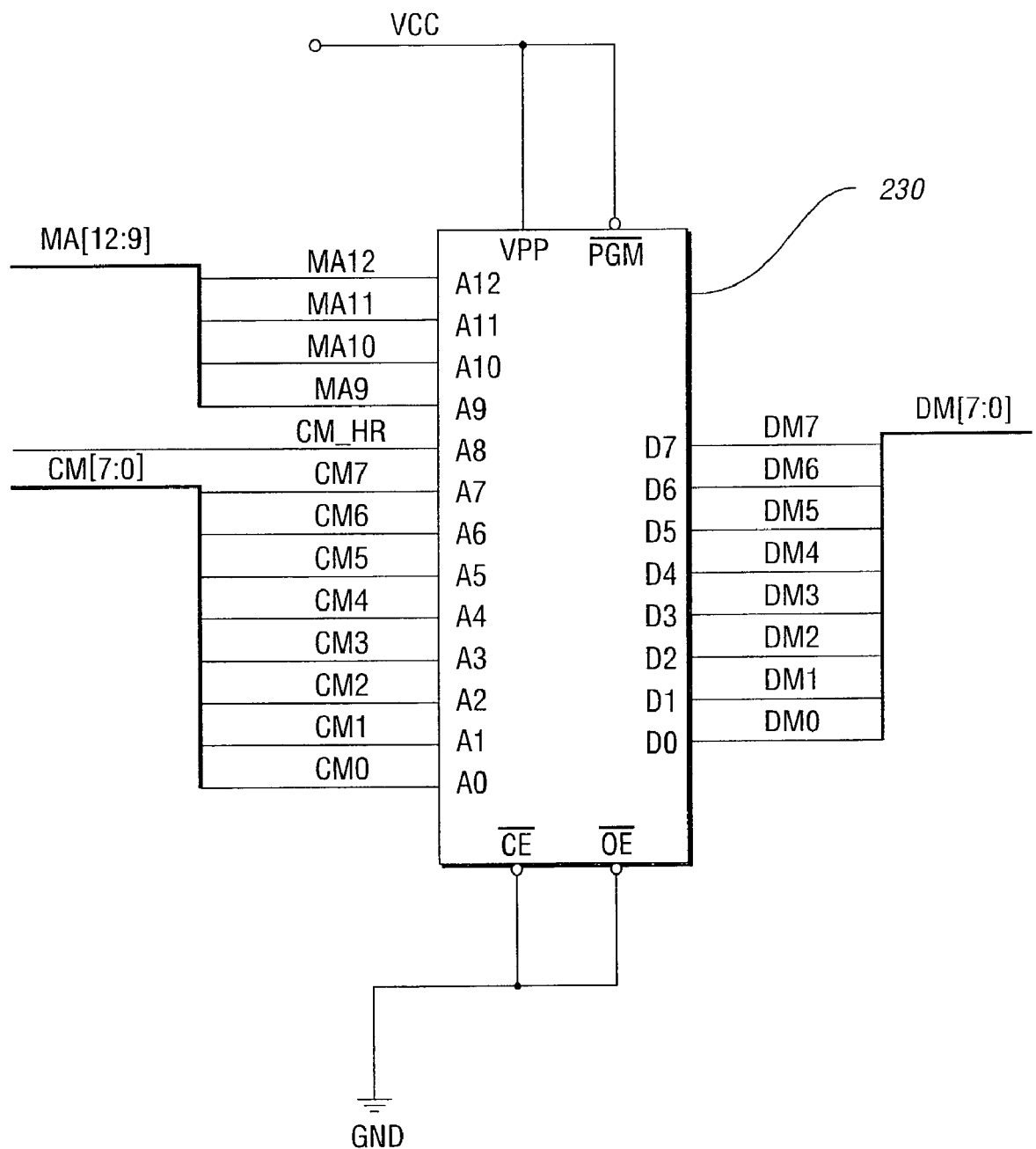
FIG. 4 is a schematic diagram for implementing a display pixel luminance mapping control according to the present invention.

Referring now to FIG. 4, an illustrative embodiment for implementing display pixel luminance mapping control 76 is shown. The same camera system and display described with regard to FIG. 3 above are used for the following illustrative example.

Memory 230 in FIG. 4 corresponds to the display pixel luminance mapping control 76 of FIG. 2. Address inputs MA12 through MA9 in FIG. 4 correspond to bus 88 from control logic 84 in FIG. 2. Address inputs CM7 through CM0 and CM_HR in FIG. 4 correspond to camera system output signal 68 in FIG. 2. Data lines DM0 through DM7 in FIG. 4 correspond to display luminance signal 78 in FIG. 2.

Read only memory 230 is programmed with a number of lookup tables to translate the illuminance portion of camera system output signal 68 into pixel luminance signal output 78. Control logic 84 outputs a static value on MA9 through MA12 to select a particular block of 512 bytes in the memory. The address within the 512 block is supplied by the pixel illuminance reading from camera system 26 in an 8-bit plus range select form. This 9-bit number requires 512 bytes whereas the 11-bit linearly encoded form requires 2048 bytes, approximately three-quarters of which would not be accessed.

Figure 5:
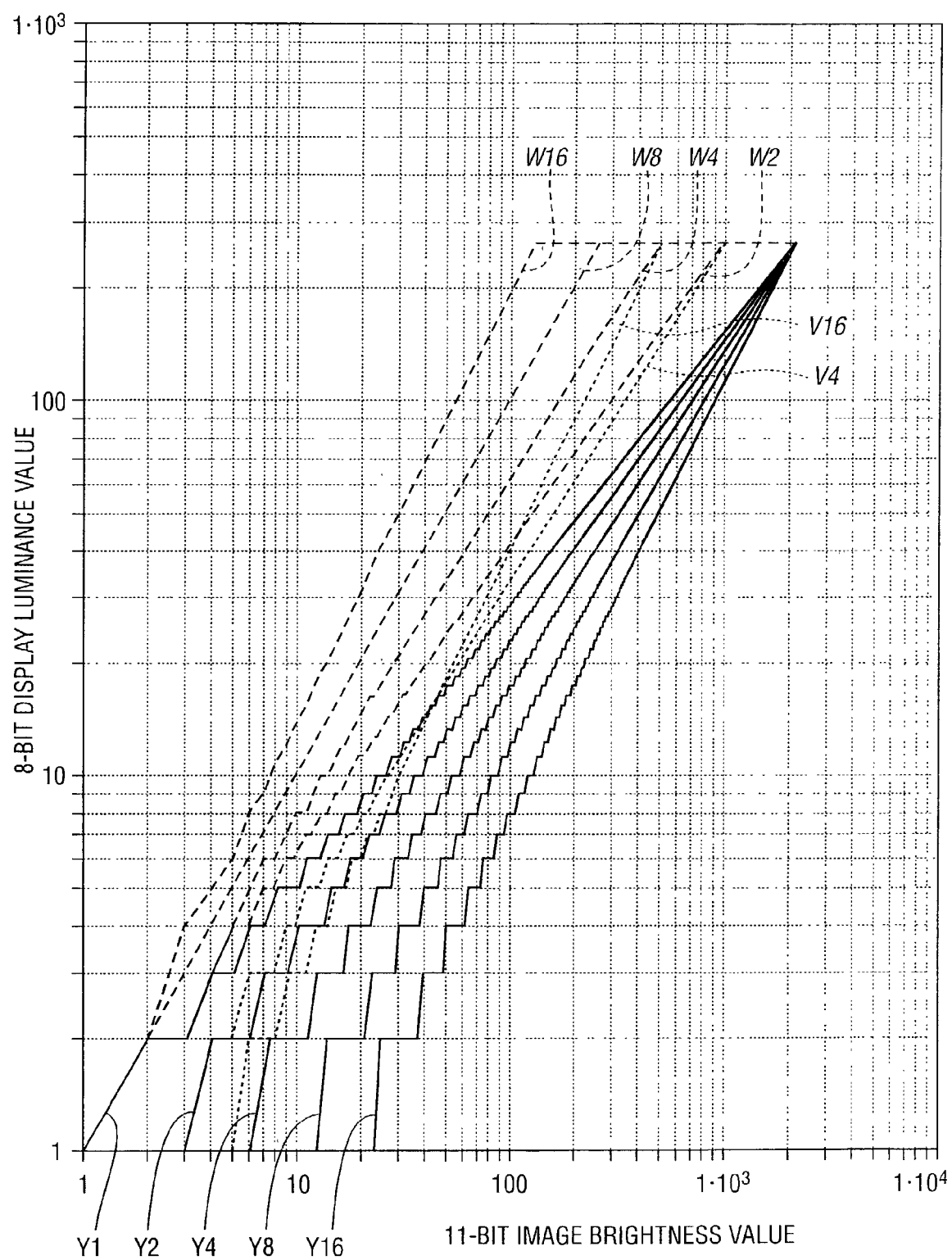
FIG. 5 is a graph of display luminance mapping according to the present invention.

Referring now to FIG. 5, a graph of display luminance mappings is shown. Each of the eleven curves shown is a plot of the 8-bit output value, shown on the vertical axis, as a function of the 11-bit input value, shown in linear form on the horizontal axis. The exemplary plots are as nearly linear as the quantized encoding will allow. A linear plot on a log-log graph has the property that, throughout the illuminance range of the scene, a particular contrast ratio in the scene is mapped onto another particular contrast ratio on the display.

Memory 230 has great flexibility to implement other curves. In an alternative embodiment, memory 230 is writable, so that more curves may be supplied and a mapping may be constructed based on the analysis of a particular scene.

The points programmed into the memory are integer valued outputs which are a function of integer values inputs. They are plotted as integer values connected by lines to prevent losing track of the curves at the lower left of the curves where the integer points are widely spaced. Also note that when the input value with the eight bits plus range selection exceeds 255, only the values whose three least significant bits are binary 111 are used so the actual curves are somewhat coarser than shown for inputs which exceed 255.

The five curves labeled Y1, Y2, Y4, Y8 and Y16 are used when the scene is bright enough such that camera system 26 is set so that the illuminance readings are as high as reasonable without having an undesirable number of pixels which are at the maximum and presumably saturated 2047 illuminance reading. This is the desired criteria for setting the camera sensitivity as explained above with regards to FIG. 3. Curve Y16, Y8, Y4 or Y2 is selected if an analysis of the histogram shows that most of the non-zero pixel readings are above 16, 8, 4 or 2 respectively. If not, Y1 is selected. To select the curve, control logic 84 maintains a static address value on MA[12:9] which selects the 512-byte block in which the required curve is programmed in memory 230 of FIG. 4.

When the majority of pixel illuminance values fall between 4 and 511, curve V16 is selected, and when the majority of the pixels fall between 2 and 1023, curve V4 is selected.

Under dim lighting conditions with the camera at maximum gain and when an appreciable number of pixel readings are below 2, one of curve W16, W8, W4, or W2 is selected if the majority of the pixel readings fall below 128, 256, 512, or 1024 respectively. Otherwise, Y1 is selected.

Note that the number suffix represents the relative slope of the curve. A suffix of 16 represents contrast enhancement (signal expansion), 8 represents flat contrast, 4 represents modest contrast loss (mild range compression), and 2 represents relatively pronounced contrast loss (pronounced range compression). Thus, the curves with the higher number suffixes representing the highest applicable contrast are given preference in the above selections.

Although a memory has been used in the illustrative embodiment described with regards to FIGS. 4 and 5, other forms of hardware or software may be used within the scope and spirit of the present invention.

Figure 6:
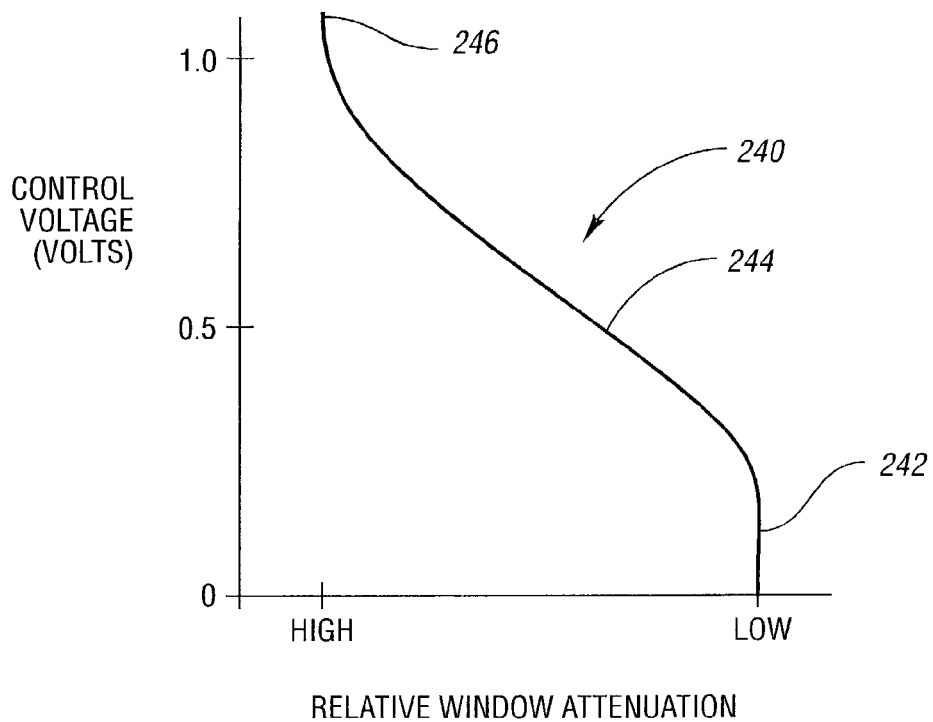
FIG. 6 is a graph of control characteristics for variable attenuation filters according to the present invention.

Referring now to FIG. 6, a graph showing the control characteristics of input variable attenuation filter 52 and display variable attenuation filter 106 is shown. In a preferred embodiment, filters 52 and 106 are both solution phase electrochromic attenuating windows. Such windows are constructed using the techniques described in U.S. Pat. No. 4,902,108 titled "SINGLE-COMPARTMENT, SELF-ERASING, SOLUTION-PHASE ELECTROCHROMIC DEVICES, SOLUTIONS FOR USE THEREIN, AND USES THEREOF" to Harlan J. Byker and assigned to Gentex Corporation, which is hereby incorporated by reference. Variable attenuating filter windows of this type have a chemical layer sandwiched between two layers of glass, each of which has a transparent conductor on the surface which contacts the chemical. The curve, shown generally as 240, shows increasing window attenuation along the decreasing vertical axis. When the voltage between the opposing electrodes is low, accomplished by shorting them or allowing the chemical to self discharge, the attenuation is low. As depicted by curve section 242 in FIG. 6, when the control voltage applied to the electrodes increases from 0 to approximately 0.35 volts, the layer becomes slightly attenuating. As control voltage is increased, the attenuation increases smoothly with increasing control voltage as shown by curve section 244. A maximum attenuation is achieved when the applied control voltage is a little over one volt, as shown in curve section 246. This characteristic is typical of a fairly wide class of solution phase electrochromic devices and reasonably reproducible from one unit to another, and reasonably stable with temperature. However, temperature compensation may optionally be included in using the voltage setting to control the attenuation of the electrochromic window.

To utilize this voltages verses attenuation characteristic, a representation of the characteristic curve 240 describing the attenuating window being controlled is programmed into control logic 84. To set the window to a particular attenuation level, control logic 84 determines the control voltage which corresponds to the desired attenuation and sends a command to the attenuation control circuit to cause this control voltage to be applied to the electrochromic attenuator. A memory lookup similar to that described with regards to FIG. 4 above may be used to implement use of the attenuation verses voltage characteristic.

By adjusting chemical composition and layer thickness, the maximum attenuation attainable by a particular electrochromic attenuator is adjustable over a wide range. Increasing the concentration or thickness of the electrochromic layer in general increases the maximum attenuation. In the design, the maximum attenuation of each electrochromic filter should be adjusted to match the maximum attenuation required after balancing this with the integration time adjustment for the camera or the intensity adjustments for the display. Also, duty cycling and optical feedback loops are alternate devices which may be incorporated in the control of the attenuation of the electrochromic filters.

For input variable attenuation filter 52, analysis of the histogram is preferably used to determine the required camera exposure. Control logic 84 then apportions the exposure between the integration time setting for the camera and the determination of the proper transmission for the electrochromic filter. Having determined the desired transmission, a voltage is selected as described and input attenuation control signal 94 is sent to input attenuation control 70, which generates input attenuation filter signal 72 for input variable attenuation filter 52.

For display variable attenuation filter 106, the camera exposure control in combination with image brightness detector 74 and display pixel luminance mapping control 76 serve to maintain the display at a relatively stable luminance level until the scene is so dark that the camera can no longer detect large portions of the scene. Thus, the function of display brightness control is primarily to vary the overall brightness to match the display brightness to the ambient light conditions. The best measurement of the ambient light level is obtained from ambient light sensor 34 which is positioned to view essentially the same field that the driver normally sees. This light level is preferably subjected to a time average of, for example, 15 seconds to derive the stabilized ambient light level used to determine the required display brightness.

Figure 7:
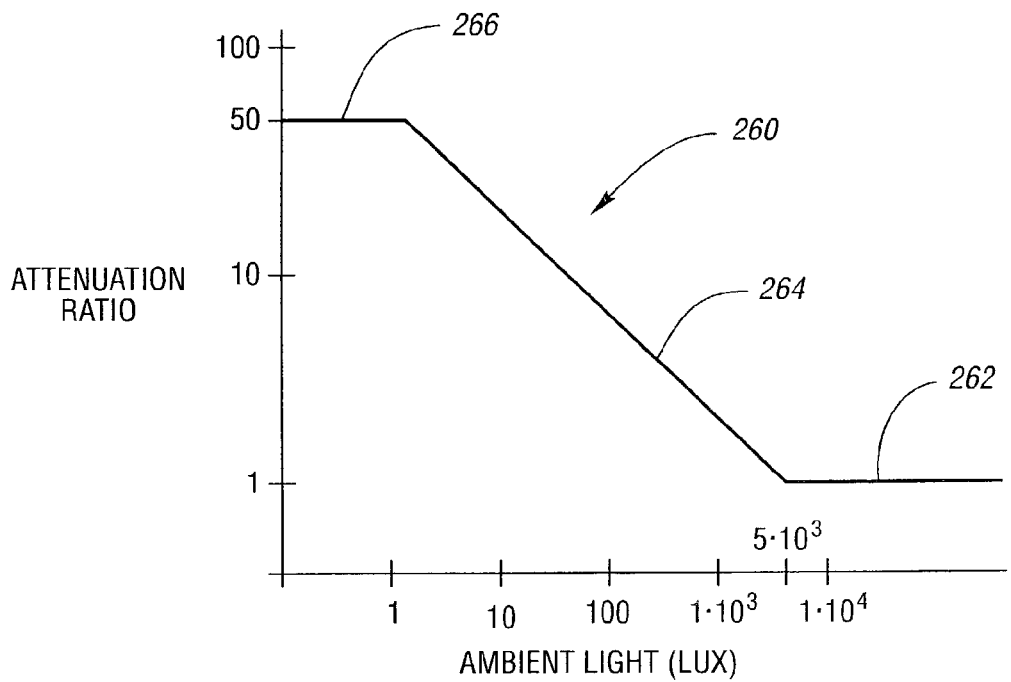
FIG. 7 is a graph of display attenuation ratio versus ambient light conditions according to the present invention.

Referring now to FIG. 7, a graph of display attenuation ratio as a function of ambient light is shown. In the following description, it will be assumed that full brightness is the base line and that the display will be set to this brightness only for very high ambient light conditions.

Curve 260 depicts the display attenuation ratio verses ambient light level characteristic on a log-log plot. Here, an attenuation ratio of one is used to indicate full brightness and, for example, an attenuation ratio of 10 is used to indicate that the display is at one-tenth of its full brightness.

For very bright ambient light conditions, 5000 lux and above, for example, the display is maintained at full brightness as indicated by curve section 262. As the ambient light level decreases over a large range, the display brightness is attenuated as indicated by sloped curve section 264. Finally, for low ambient light levels, below 1 lux for example, the display illumination is maintained at a relatively constant value as indicated by curve section 266.

Curve 260 illustrates a display brightness about 50 times lower for very low ambient light conditions. Specific numbers and threshold values will vary considerably with the position of the display and its type. It is understood that the numbers which are optimal for a given configuration may differ considerably from those given here and should be established after careful evaluation of a particular system.

Control logic 84 determines the desired attenuation of display 96 from full brightness based on the ambient light level and a prescription of brightness or attenuation such as the one depicted in FIG. 7. Control logic 84 then apportions the reductions from full brightness between the direct control of the display brightness through display control signal 104 and the setting of display variable attenuation filter 106 through display attenuation control signal 114 so as to achieve the desired display intensity.

A vehicle viewing system capable of providing an image of a scene to an operator under a wide variety of environmental conditions has been presented. While the best modes for carrying out the invention have been described in detail, those familiar with the art to which this invention relates will recognize various alternative designs and embodiments for practicing the invention as defined by the following claims.

The invention claimed is:

1. A vehicle viewing system for displaying an image of a scene to a vehicle operator, the system comprising:
    a camera system to generate a signal corresponding to the scene by integrating light from the scene incident on pixel cells, the pixel cells having a variable integration time that sets the length of time during which the pixel cells integrate light despite being exposed to light over a longer period comprising:
        an optical sensor operative to produce a digital signal corresponding to the scene, wherein the digital signal comprising a magnitude and a range for each pixel cell, the range indicative of the integration period used by the pixel cell; and
        a lens system to focus the image of the scene onto the optical sensor;
    a display system to present the image of the scene; and
    a processor system in communication with the camera system and the display system, the processor system operable to determine the camera system integration time based on brightness levels in the scene.

2. A vehicle viewing system as in claim 1, the camera system further comprising:
    a variable input attenuation filter to limit the light from the image which strikes the optical sensor.

3. A vehicle viewing system as in claim 2 wherein the variable input attenuation filter comprises an electrochromic window.

4. A vehicle viewing system as in claim 1 wherein the optical sensor is an array of photogate CMOS active pixel sensors.

5. A vehicle viewing system as in claim 1 wherein the optical sensor is operative to implement a plurality of architectures for integrating and processing the image and wherein the processor system is operative to determine the measures of the image brightness and to determine which architectures will be in use based on the image brightness measures.

6. A vehicle viewing system as in claim 1 wherein the optical sensor is operative to reset at least one pixel sensor during an integration period and the processor system is operative to determine if each of the pixel sensors is to be reset and, for each pixel sensor to be reset, the reset time during the integration period.

7. A vehicle viewing system as in claim 1 wherein the processor system comprises an image brightness detector to sample the brightness values of the image produced by the camera system and to determine measures representative of image brightness.

8. A vehicle viewing system as in claim 7 wherein the image brightness detector is operable to determine a histogram of image brightness values for image frames output from the camera system.

9. A vehicle viewing system as in claim 7 wherein the processor system further comprises a display pixel luminance mapping control that uses the image brightness measures to determine luminance settings for the display system.

10. A vehicle viewing system as in claim 1 wherein the processor system is operable to select a curve from a plurality of curves, each curve relating display luminance as a function of image brightness measures, and wherein the processor system is operable to output a display luminance value based on an image brightness value using the selected curve.

11. A vehicle viewing system as in claim 1, wherein the processor system is operable to modify the color balance of the display system so as to reduce the relative amount of blue light in dim ambient light conditions.

12. A vehicle viewing system as in claim 1, wherein the display system comprises:
    a display for emitting light forming the image of the scene; and
    a display variable attenuation filter for receiving the light forming the image of the scene and for limiting the light emitted from the display.

13. A vehicle viewing system as in claim 12, wherein the display variable attenuation filter is an electrochromic window.

14. A vehicle viewing system as in claim 1 further comprising:
    an ambient light sensor for detecting the level of ambient light; and
    a control logic for determining display system brightness based on the level of ambient light.

15. A vehicle viewing system as in claim 1 further comprising:
    a direct glare sensor for detecting the level of glare seen on the display system; and
    a control logic for determining display system brightness based on the level of glare seen on the display system.

* * * * *

UNITED STATES PATENT AND TRADEMARK OFFICE
CERTIFICATE OF CORRECTION

PATENT NO. : 7,567,291 B2
APPLICATION NO. : 10/259253
DATED : July 28, 2009
INVENTOR(S) : Jon H. Bechtel et al.

It is certified that error appears in the above-identified patent and that said Letters Patent is hereby corrected as shown below:

Cover Page, item [57] Abstract, line 8, after "includes" delete "and".

Column 3
Line 48, after "directly" insert --in--.

Line 49, "than" should be --that--.

Column 4
Line 41, delete "pending".

Line 43, "et. al." should be --et al.--.

Line 51, "et. al." should be --et al.--.

Line 60, "et. al." should be --et al.--.

Column 5
Line 4, "et. al." should be --et al.--.

Line 33, "et. al." should be --et al.--.

Column 8
Line 46, "show" should be --shows--.

Line 64, "et. al." should be --et al.--.

Column 9
Line 3, "form" should be --from--.

Column 12
Line 41, "CM-HR" should be --CM_HR--.

Line 46, "000 CM7" should be --0 0 0 CM7--.

Column 13
Line 45, "156-511" should be --256-511--.

CERTIFICATE OF CORRECTION (continued)
U.S. Pat. No. 7,567,291 B2

Column 16
Line 1, "verses" should be --versus--.

Line 10, "verses" should be --versus--.

Line 53, "verses" should be --versus--.

Column 17
Line 33, claim 1, "comprising a magnitude" should be --comprises a magnitude--.

Signed and Sealed this

Twentieth Day of April, 2010

David J. Kappos
*Director of the United States Patent and Trademark Office*